(12) United States Patent
Harrison

(10) Patent No.: US 6,279,801 B1
(45) Date of Patent: Aug. 28, 2001

(54) VEHICLE ROOF RACK AND CARRIER FOR EASY LOADING/UNLOADING

(76) Inventor: Marek R. V. Harrison, 4509 S. Renellie Dr., Tampa, FL (US) 33611

( * ) Notice: Subject to any disclaimer, the term of this patent is extended or adjusted under 35 U.S.C. 154(b) by 0 days.

(21) Appl. No.: 09/378,172

(22) Filed: Aug. 20, 1999

(51) Int. Cl.⁷ ................................................... B60R 9/00
(52) U.S. Cl. ......................... 224/310; 224/321; 414/462
(58) Field of Search .................................... 224/310, 321, 224/309; 414/462

(56) References Cited

U.S. PATENT DOCUMENTS

| | | | | |
|---|---|---|---|---|
| 4,009,762 | * | 3/1977 | Bjerkgard | 182/20 |
| 4,728,244 | * | 3/1988 | Stokkendal | 414/462 |
| 5,297,912 | * | 3/1994 | Levi | 414/462 |
| 5,330,212 | * | 7/1994 | Gardner | 280/40 |
| 5,348,327 | * | 9/1994 | Gieske | 280/47.331 |
| 5,586,856 | * | 12/1996 | Springer | 414/462 |
| 5,848,743 | * | 12/1998 | Derecktor | 224/331 |
| 5,904,463 | * | 5/1999 | Christensen | 414/462 |

FOREIGN PATENT DOCUMENTS

| | | | |
|---|---|---|---|
| 3237906 | * | 4/1984 | (DE) . |
| 4010175 | * | 10/1991 | (DE) . |
| 2501601 | * | 9/1982 | (FR) . |
| 2250492 | * | 6/1992 | (GB) . |
| 406099776 | * | 4/1994 | (JP) . |

* cited by examiner

Primary Examiner—Stephen K. Cronin
(74) Attorney, Agent, or Firm—Pendorf & Cutliff

(57) ABSTRACT

A vehicle roof rack and carrier for easy loading/unloading of sporting equipment including a carrier that is formed by a front frame portion, a rear frame portion, a middle frame portion, and a wheel assembly. The middle frame portion has a plurality of spaced apart mounting pins. Included is a roof rack. The roof rack is mounted onto a vehicle roof. The roof rack has a first carrier rail and a second carrier rail. The first and second carrier rails are each supported on the vehicle roof with a pair of end brackets. The first carrier rail and the second carrier rail are spaced an equal distance about the vehicle roof to support the carrier. The plurality of mounting pins of the middle frame portion are in releasable engagement with the first and second carrier rails for securing the carrier with the sporting equipment on the vehicle.

19 Claims, 8 Drawing Sheets

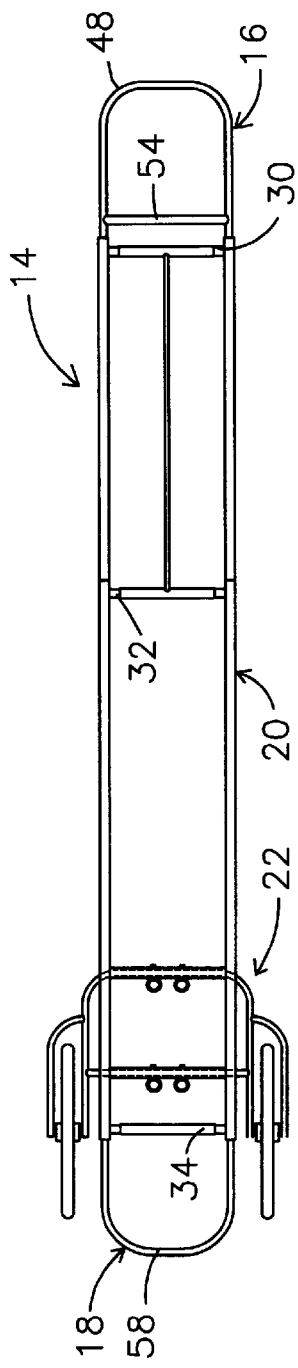
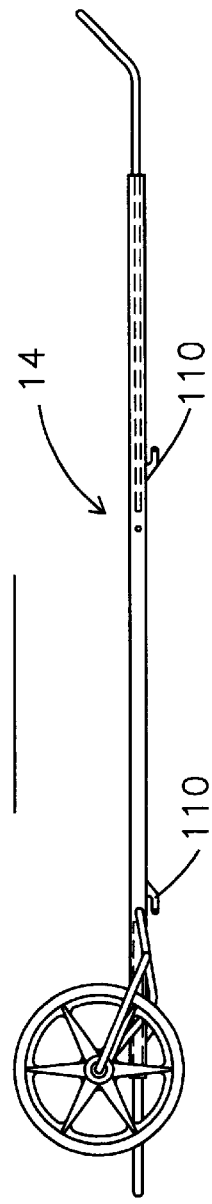
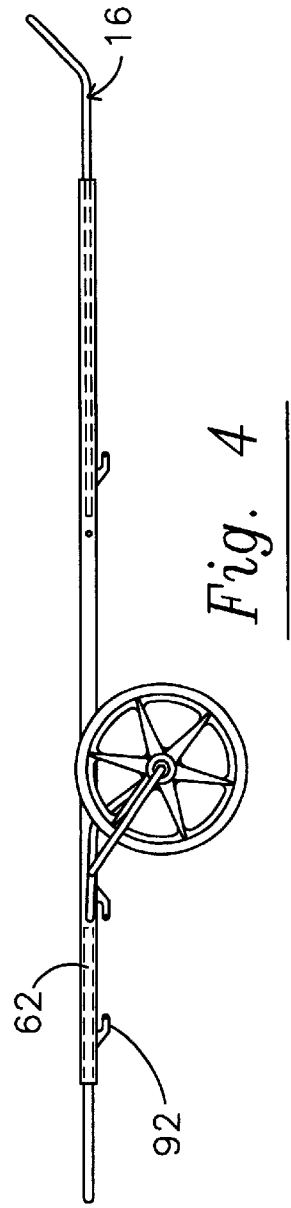
Fig. 2
Fig. 3
Fig. 4

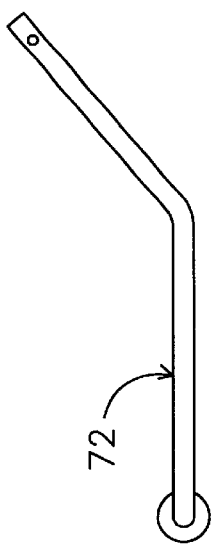
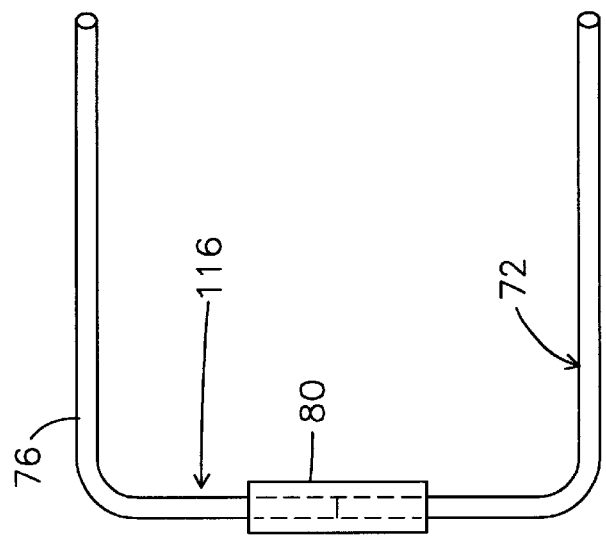
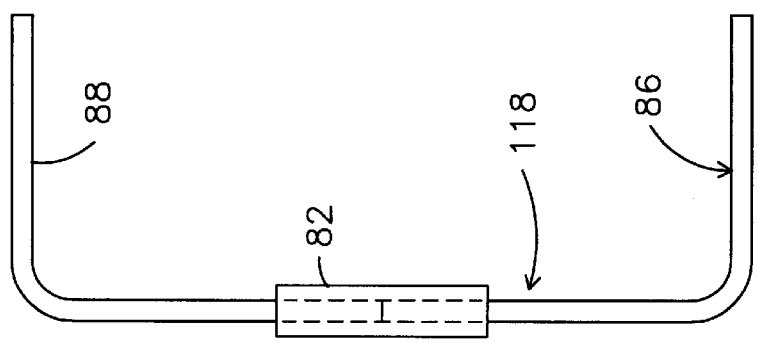

VEHICLE ROOF RACK AND CARRIER FOR EASY LOADING/UNLOADING

BACKGROUND OF THE INVENTION

1. Field of the Invention

The present invention relates to a vehicle roof rack and carrier for easy loading/unloading, and, more particularly, pertains to providing a device that includes a vehicle roof mount with carrier for supporting kayaks, canoes, windsurf boards, and roof boxes being transported on the roof of a vehicle, and, more particularly, provides the user with an easy way to load and unload the equipment from atop the vehicle.

2. Description of the Prior Art

The use of a vehicle roof rack and canoe/kayak carrier is known in the prior art. More specifically, vehicle roof racks and canoe/kayak carriers heretofore devised and utilized for the purpose of transporting sporting equipment on top of a vehicle and over ground from the vehicle to the point of use is known to consist basically of familiar, expected, and obvious structural configurations, notwithstanding the myriad of designs encompassed by the crowded prior art which have been developed for the fulfillment of countless objectives and requirements.

By way of example, the prior art includes U.S. Pat. No. 5,884,824 to Spring, Jr. disclosed an equipment transport rack for vehicles providing improved loading accessibility. The equipment transport rack of this invention performs equally well with various sports equipment payloads including: skis and ski equipment; fishing poles; snowboards; surfboards and windsurfing boards; canoes; rafts; kayaks; small boats including sailboats with detachable sails; bicycles; water skis; wake boards; knee boards; hockey sticks; luggage racks, luggage carriers, recreation boxes; and camping-related cargo such as tents and supplies. In addition, non-sports related or utility cargo, such as ladders, lumber, plumbers pipe or tube may be effectively transported. Further, Spring anticipates that, in addition to the known sports and non-sports related equipment, it is listed in the specification of the patent that there are equivalent, new sports and non-sports related equipment that will become known over time and will be advantageously carried by the equipment transport rack. The Spring patent has an equipment transport rack provided with two operational positions or modes: transport and loading. In the transport position or mode, the payload is carried above the roof height or about the roof surface within the boundaries of the roof edge, removably secured by a dedicated payload carrier, which has a structure specialized for holding single or multiple equipment types.

Furthermore, to facilitate loading or unloading of the equipment payload, the equipment transport rack of Spring includes a moveable section, or carriage assembly, which holds the equipment payload in the payload carrier. Also, the carriage assembly extends outwardly and pivots downwardly from the roof area to project the payload carrier beyond the boundary of the roof edge and at least partially below the height of the roof edge and roof surface.

Applicants' invention is intended to be much more simplistic than Spring. The roof rack has carrier rails coupled with a support foot means, which provides a fixed footing or mounting means for the rack onto the vehicle. Applicants' invention does not include the carriage assembly but includes the payload carrier and means for extending the rack outwardly, at least partially over the roof edge, and downwardly, at least partially below the height of the roof edge. Applicants' invention uses the carrier apparatus designed for use with Applicants' roof rack to move the equipment along the carrier rail of the rack.

Another example of a roof rack is U.S. Pat. No. 5,775,557 to Arvidsson which discloses an arrangement for carrying a craft on a vehicle roof. This patent is a continuation of an earlier Arvidsson U.S. Pat. No. 5,516,017 disclosing a similar arrangement. The Arvidsson '557 devise is an arrangement designed so to permit simple adaptation to a craft having different shapes, not only crafts of different widths, but also crafts having different arching or angles in the bottom of the hull. The Arvidsson '557 invention further has for its object to devise an arrangement that facilitates loading and unloading of the craft, which may readily and conveniently be mounted on conventional roof racks. Specifically, the '557 patent has an adjustable bracket arrangement that is attached to the carrier rails/carrier beams of the roof rack.

The invention that is taught by Applicants' invention does not include the bracket device of Arvidsson '557 or '017. Arvidsson's bracket device comprises two brackets that are displaceable along the load carrier beam and securable in optional positions along the load carrier beam. The brackets are provided with support members in the form of platform support portions on which the craft is intended to rest. Further, by moving the brackets towards or away from one another, the distance between the support portions may be varied within broad limits, whereby allowing the brackets to adapt to different craft widths.

Further, U.S. Pat. No. 5,875,946 to Knudsen discloses a portage system for light watercraft that allows the craft to be transported by an individual. It is a more specific object to provide a portage system for light watercraft that enables a user to use both hands while the watercraft is supported above the user's head while limiting unintended contact between the craft and foreign objects. Knudsen's portage system supports a light watercraft. In a particular embodiment, the portage system includes a frame having opposed first and second upright arms, a plurality of cross-struts interconnecting the arms, a pair of shoulder straps secured to a cross strut, and a hip belt secured adjacent bottom ends of the upright members to removably secure the frame to a user; first and second thwart cradles adjustably secured to top ends of the first and second upright arms so that a center thwart of the watercraft may engage the first and second thwart cradles to support the watercraft at varying heights above the user; and a balance strap adjustably secured between a bottom end of an upright arm and a forward attachment point on the watercraft. The Applicants have a carrier that is easily removed from the roof rack and then transported about the wheel assembly from the vehicle to the debarking location. Applicants' invention is not intended for use in carrying equipment above the shoulders of the user.

With regard to carrier devices, U.S. Pat. No. design 386,145 to Staller discloses a kayak rack, and U.S. Pat. Design 380,708 to Witt discloses a canoe/kayak carrier. Staller discloses a simple triangular device. Witt shows a simple carrier that cannot be used in conjunction with a vehicle roof rack.

In U.S. Pat. No. 5,598,959 to Lorensen et al., an article-carrying rack with lockable mount is disclosed. The article-carrying racks, more particularly, concern an article-carrying rack with a lockable mount that allows the rack and mount to be locked in place on a vehicle, whether articles are carried thereon or not.

Lastly, U.S. Pat. No. 5,848,743 to Derecktor discloses a vehicle roof rack. This invention relates generally to roof racks, and more particularly to a roof rack that attaches to the roof of a vehicle having a rain gutter. Roof racks that are attached to gutters provided along opposite sides of a roof of a vehicle, such as an automobile or van, are well known in the art. Currently, Applicants' roof rack does not teach attaching to gutters, but it is an option that may be available for use with the Applicants' carrier.

Various types of utility vehicle racks are known for carrying various sporting and non-sporting equipment over the roof of a vehicle. Whether the vehicle is a car, cargo van, mini-van or sports utility vehicle. In most cases the roof rack consists of a member which extends transversally above the roof of the vehicle and which is detachably secured at its opposite ends to the body of the vehicle. A rack assembly typically can be adjusted in length completely at the discretion of the user in order to fit the rack to any desired vehicle.

Prior attachment devices for detachable mounting of racks on automobiles have been of four general types. In a first category, the pedestal or bracket by which the rack is positioned above the roof relies upon seated reference in a rain-gutter. A second rack category relies on support pads which sit on the roof, and rely on tie-down straps which hook over the edge of the roof. The third category is also characterized by reliance on support pads, but these pads are of an adjustable width so that the pad can be on or very near the edge of the roof where the roof can structurally support the load. A forth category is concerned with various methods for detachably assembling roof racks, such as luggage carrier racks, to the roof of a vehicle. Generally, such racks having spaced rails have end holes that align with round holes through the roof of the vehicle at predetermined locations. These holes allow the rack to be secured to the vehicle roof. Some such arrangements are shown in U.S. Pat. Nos. 4,162,755; 4,277,009; and 4,448,336.

Furthermore, various methods are used to carry equipment from the roof of a vehicle to the location of use. Most of the time the user, with assistance of another person, removes the kayak/canoe or other item and carries it from the vehicle to the point of use. There is no teaching for the solo system created by using the roof rack carrier combination of the Applicants.

In this respect, the vehicle roof rack and carrier for easy loading/unloading according to the present invention substantially departs from the conventional concepts and designs of the prior art, and in so doing, provides an apparatus primarily developed for the purpose of providing a device that includes a vehicle roof mount with carrier that will support kayaks, canoes, windsurf boards, and roof boxes transported on the roof of a vehicle, while at the same time, providing the user with an easy way to load and unload the equipment from atop the vehicle.

Therefore, it can be appreciated that there exists a continuing need for a new and improved vehicle roof rack and carrier for easy loading/unloading that can be used for providing a device for supporting kayaks, canoes and roof boxes being transported on the roof of a vehicle. In this regard, the present invention substantially fulfills this need.

SUMMARY OF THE INVENTION

Accordingly, a primary function of the vehicle roof rack and carrier for easy loading/unloading is to first provide a device for supporting kayaks, canoes, and roof boxes that are being transported on the roof of a vehicle, and secondly to provide an easy way to remove the equipment and transport the equipment to the place of use. As such, the general purpose of the present invention will be described subsequently in greater detail.

To attain this, the present invention essentially comprises a carrier formed by a front frame portion, a rear frame portion, a middle frame portion, and a wheel assembly. The middle frame portion has a plurality of mounting pins that are spaced apart. Included is a roof rack. The roof rack is mounted onto a vehicle roof. The roof rack has a first carrier rail and a second carrier rail. The first and second carrier rails are each supported on the vehicle roof with a pair of end brackets. The first carrier rail and the second carrier rail are each spaced an equal distance above the vehicle roof to support the carrier. The plurality of mounting pins of the middle frame portion are in releasable engagement with the first and second carrier rails for securing the carrier with the sporting equipment on the vehicle. Further, the first carrier rail and the second carrier rail each have a telescopic extension with a telescopic foot support. In use, the telescopic extension of the first carrier rail is extended so to allow the telescopic foot support to be extended parallel the transporting vehicle and placed on the ground for maneuvering the carrier form of the roof rack.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle roof rack and carrier for easy loading/unloading that has all the advantages of the prior art vehicle roof racks and canoe/kayak carriers, and none of the disadvantages.

Another object of the present invention is to provide a new and improved vehicle roof rack and carrier for easy loading/unloading that includes a vehicle roof rack that may be easily and efficiently manufactured and marketed.

It is the object of the present invention to provide a new and improved vehicle roof rack and carrier for easy loading/unloading wherein the vehicle roof rack may be easily mounted onto the roof top of vehicle without an existing rack or used to replace the existing roof rack of a vehicle.

A further object of the present invention is to provide a new and improved vehicle roof rack and carrier for easy loading/unloading that has a carrier that is of a durable and reliable construction, and easy to load and unload from the roof rack.

An even further object of the present invention is to provide a new and improved vehicle roof rack and carrier that is susceptible of a low cost of manufacture with regard to both materials and labor, and which accordingly is then susceptible of low prices of sale to the consuming public, thereby making such vehicle roof rack and carrier for easy loading/unloading economically available to the buying public.

Still yet another object of the present invention is to provide a new and improved vehicle roof rack and carrier for easy loading/unloading which provides in the apparatuses and methods of the prior art some of the advantages thereof, while simultaneously overcoming some of the disadvantages normally associated therewith.

Still another object of the present invention is to provide a device that will support kayaks, canoes, and roof boxes being transported on the roof of a vehicle and allow one person to load and unload the transported object.

Yet still another object of the present invention is to provide a carrier that can be easily assembled and disassembled for storage when not in use.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is Illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the carrier with the wheel assembly in a resting position.

FIG. 3 is a side view of the carrier and wheel assembly of FIG. 2.

FIG. 4 is side view of the carrier with the wheel assembly in an operable orientation.

FIG. 17 is a top plan view showing the first and second linking arm coupled via the long bar.

FIG. 18 is a top plan view showing the first and second carriage assembly coupled via the connector.

FIG. 19 is a side view of the first carriage assembly depicting the bend of the carriage assembly.

Similar reference characters refer to similar parts throughout the several views of the drawings.

DESCRIPTION OF THE PREFERRED EMBODIMENT

Figure 1:
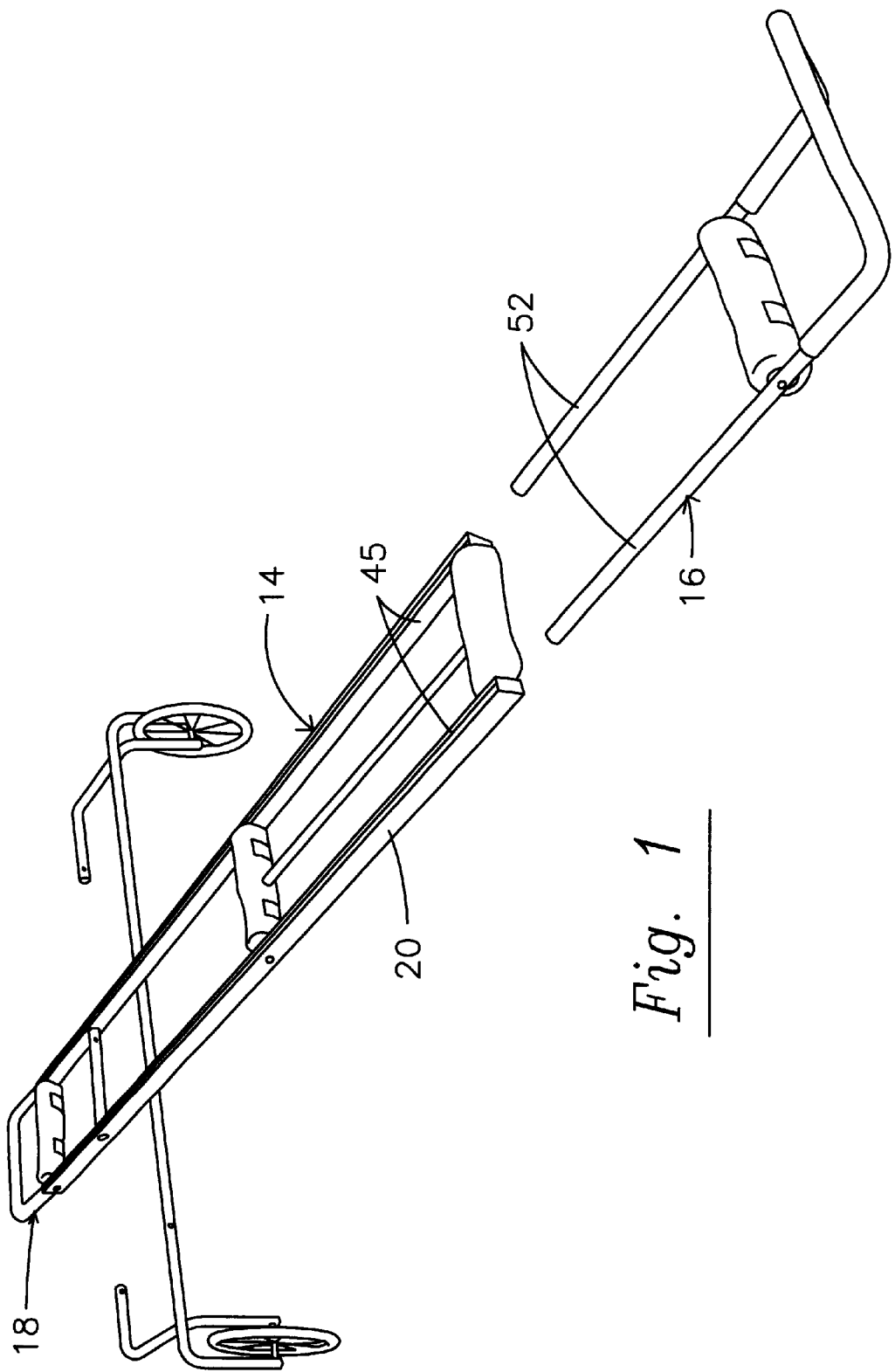
FIG. 1 is a perspective illustration of the preferred embodiment of the carrier constructed in accordance with the principles of the present invention.

With reference now to the drawings, and in particular to FIG. 1 thereof, a vehicle roof rack and carrier for easy loading/unloading embodying the principles and concepts of the present invention and generally designated by the reference numeral 14 will be described.

The present invention, vehicle roof rack, and carrier for easy loading/unloading, are comprised of a plurality of components. Such components in their broadest context include a carrier with a wheel assembly and a roof rack with a telescopic extension and a telescopic foot support. Such components are individually configured and correlated with respect to each other so as to attain the desired objective.

More specifically, the present invention a carrier 14 as shown in FIG. 1. The carrier is formed by a front frame portion 16, a rear frame portion 18, a middle frame portion 20, and a wheel assembly 22. All of the parts of the present invention are made of a lightweight aluminum, but may be made of plastic or other light metal. Further, all parts are hollow and not made of a solid construction.

Figure 6:
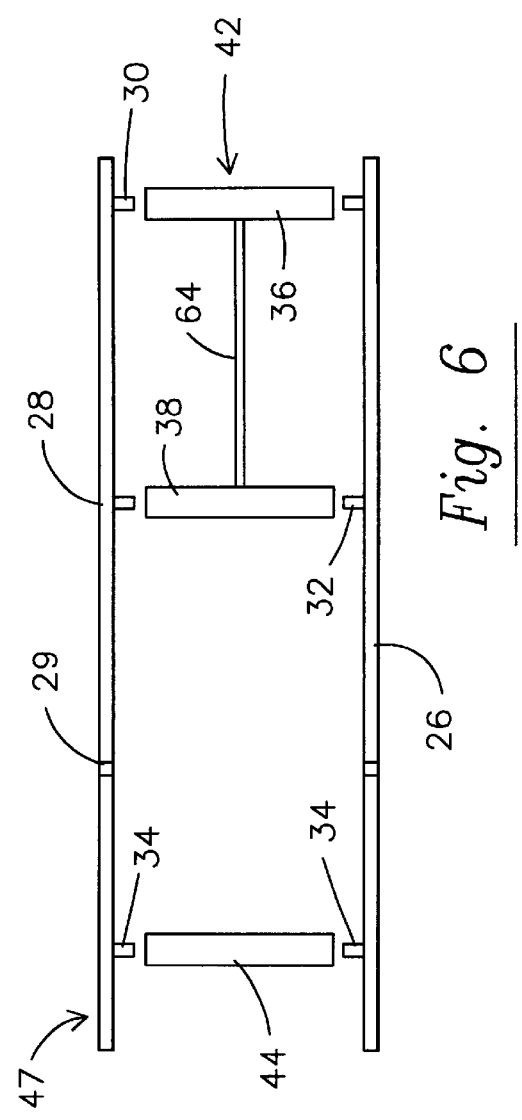
FIG. 6 is an exploded view of the middle frame portion.

As illustrated in FIG. 6, the middle frame portion 20 is constructed from a first frame member 26 and a second frame member 28. The first frame member and the second frame member of the middle frame portion each has three vertical projections and a pass through 29. Two of the projections 30 and 32, on each of the frame members, are positioned near the front frame portion as best illustrated in FIG. 2. One of the three projections 34, on each of the frame members, is spaced from the rear frame portion as best illustrated in FIG. 2. The projections 30, 32, and 34 of each frame member, are used to couple the first and second frame member to a first 36 and second 38 spreader tube of an I-shaped guide bar 42 and a third spreader tube 44. When the first frame member and the second frame member are coupled together with an I-shaped guide bar, the middle frame portion forms a first end arm pair 45 and a second end arm pair 47. The coupling with the I-shaped guide bar must be by simultaneous coupling. The first end arm pair is coupled with the front frame portion, and the second end arm pair being coupled with the rear frame portion.

The front frame portion 16 of the present invention has a handle 48 with a pair of linear frame arms 52 extending outwardly therefrom. The pair of linear frame arms, as shown in FIG. 1, are coupled with the first end arm pair of the middle frame portion of the carrier. The pair of linear frame arms further includes a stabilizer bar 54 therebetween and spaced from the handle.

The rear frame portion has a handle 58 with a pair of linear frame arms 62 projecting outwardly therefrom. The pair of linear frame arms are best shown in FIG. 4, coupled within the second end arm pair of the middle frame portion of the carrier.

Figure 12:
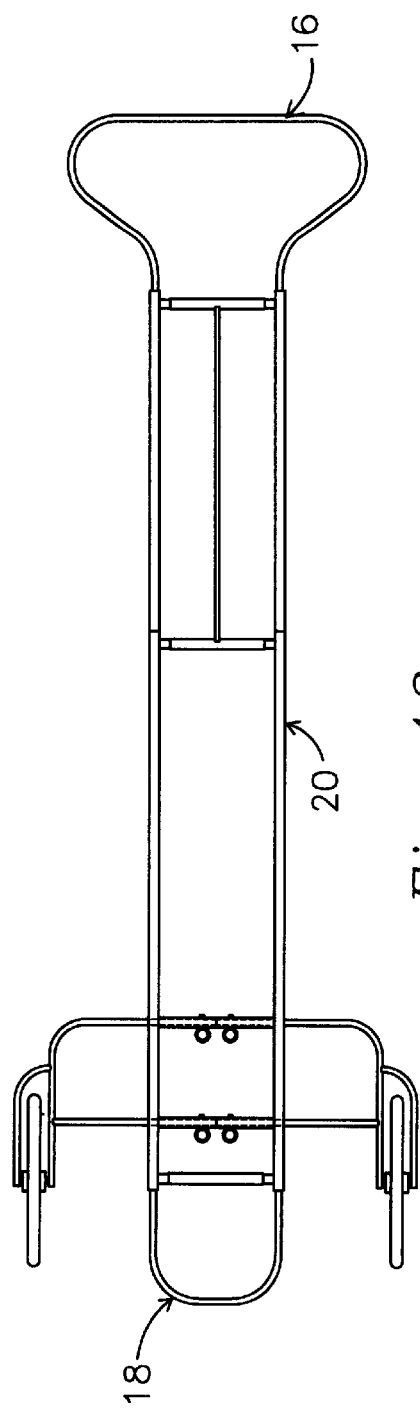
FIG. 12 is a top plan view of an alternative embodiment of the carrier with the wheel assembly in a resting position.

The I-shape guide bar is used to aid in loading and unloading the carrier. The first spreader tub and a second spreader tube are coupled with a linear rod 64. The linear rod is parallel to the first frame member and the second frame member when the I-shaped guide bar is in position and coupled to the first and second frame members of the middle frame portion, as shown in FIGS. 2 and 12.

Figure 5:
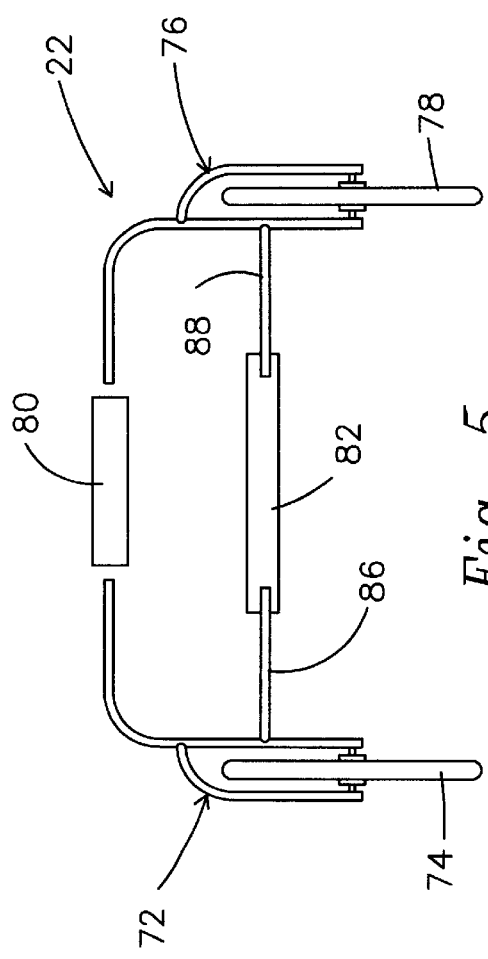
FIG. 5 is a perspective illustration of the wheel assembly.
Figure 7:
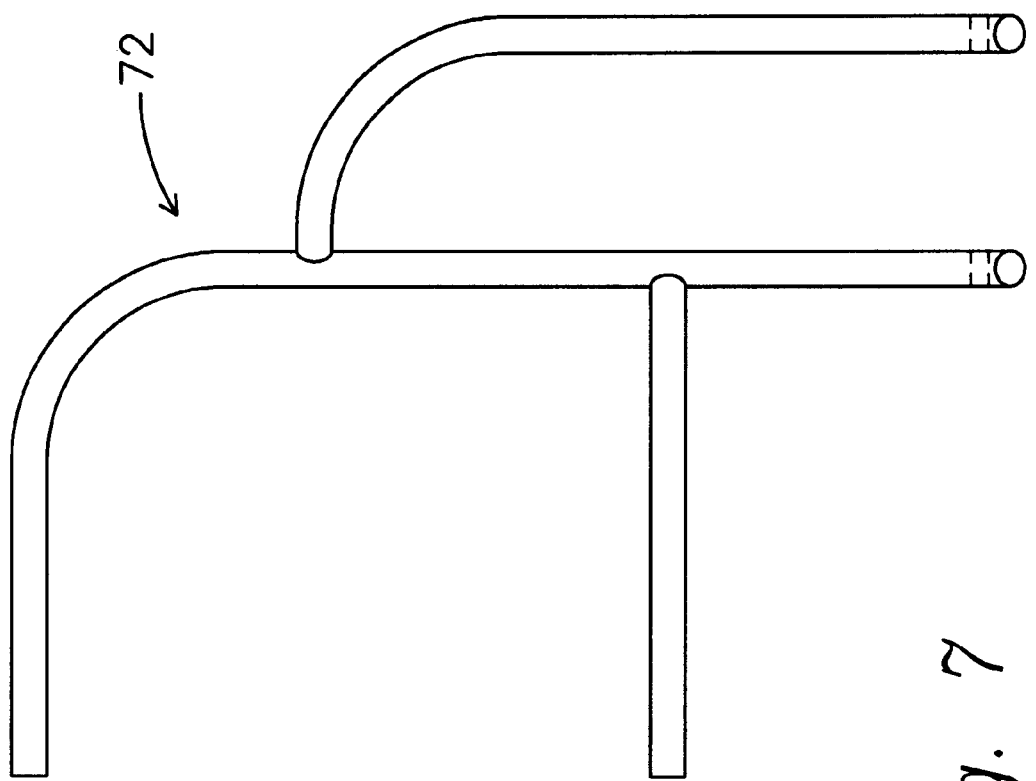
FIG. 7 is a perspective view of the carriage assembly of the wheel assembly.
Figure 10:
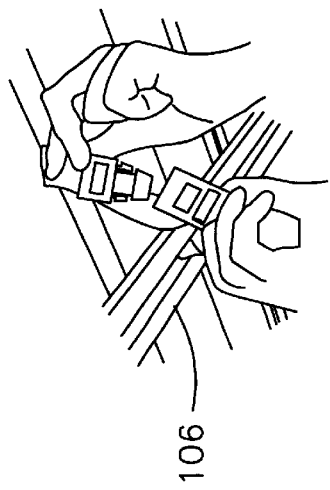
FIG. 10 is a bottom view of I-shaped guide bar with strap.

In operation, the carrier with the equipment is moved from one location to another via the wheel assembly. The wheel assembly is pivotally coupled to the middle frame portion 20 between the I-shaped guide bar and the third spreader tube. The positioning of the wheel assembly is very important, in that the operable placement of the wheels allows the weight of the equipment to be proportionately allocated along the carrier. The wheel assembly has a first carriage assembly 72 with a wheel 74 and a second carriage assembly 76 with a wheel 78. The first carriage assembly is rotatably positioned within the first frame member 26 of the middle frame portion. The second carriage assembly is rotatably positioned within the second frame member 28 of the middle frame portion. The first carriage assembly and the second carriage assembly are in pivotal communication with the middle frame portion 20 via the pass through of the first and second frame members, as seen in FIGS. 2 and 4. A connector 80 is used to couple the first carriage assembly and the second carriage assembly after they have been placed through the complimentary pass throughs of the middle frame. A long bar 82 connects another portion of the first and second carriage assembly, as depicted in FIG. 5, to keep the wheel assembly from wobbling during use. FIG. 7 is a perspective view of the first carriage assembly without the wheel.

Further, the first carriage assembly has a first linking arm 86. The second carriage assembly has a second linking arm 88. The connector is used to hold the first and second linking arms together with the middle frame portion to allow the wheel assembly to pivot up and down with respect to the middle frame portion. The connector is a hollow cylindrical tubing.

Each carriage assembly has a slight bend adjacent the linking arm. The bend, as shown in FIG. 19, forms an angle from between 135° to about 140°. The bend allows the wheels to support the frame portions of the carrier above the ground once rotated from the resting position. Without the bend, when the rack is removed from atop the vehicle, the wheels would rotate to a position almost parallel the middle frame portion. Further, the bend helps the placement of the wheel so as to allow the weight of the carrier object being carried to be disbursed proportionately for ease of carrier movement.

When the carrier is on top of the vehicle, the wheel assembly is rotated upward, and the long bar 82 is locked within an adjustable mounting pin 92, as best seen in FIG. 3. When the carrier is placed on the ground, the wheel assembly swings back away from the mounting pin to allow the long bar to rest adjacent the middle frame portion so to allow the wheel to move the carrier, see FIG. 11.

Figure 11:
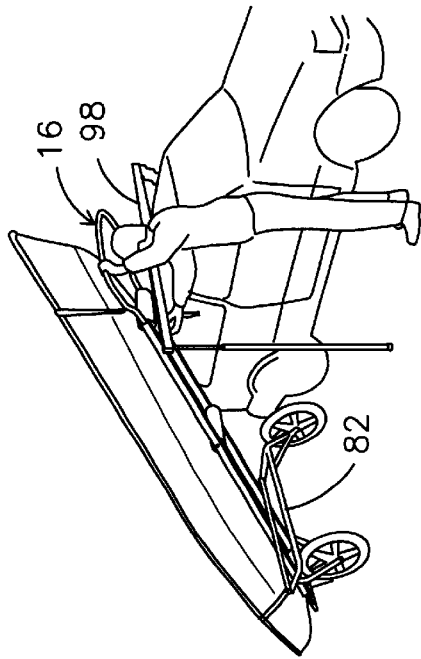
FIG. 11 is an operable view of a canoe mounted on the carrier, with the carrier supported on the ground by the wheel assembly and the telescopic foot support.
Figure 8:
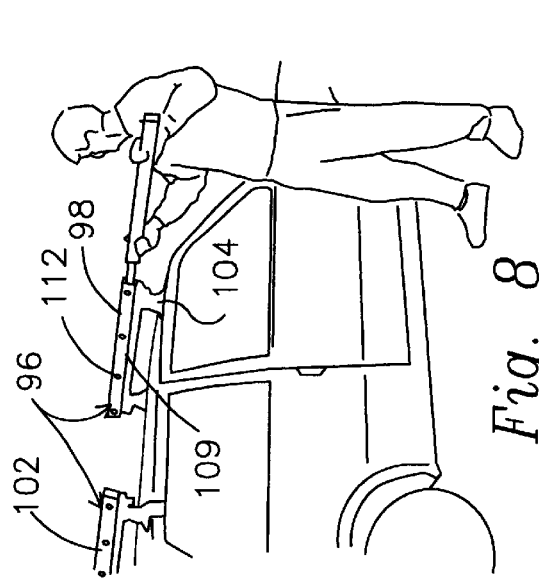
FIG. 8 is a side view of the roof rack in a pre-operable orientation.
Figure 9:
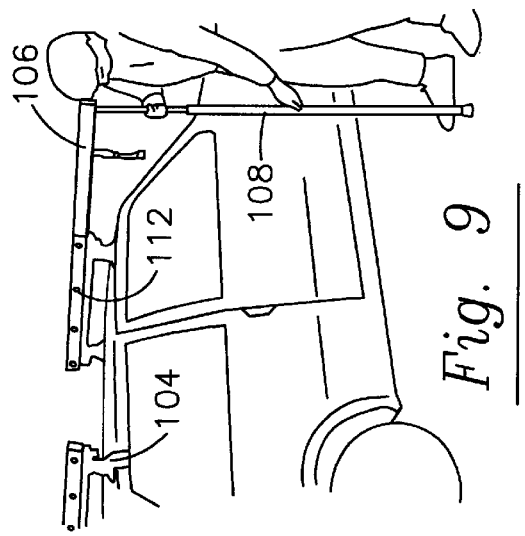
FIG. 9 is a side view of the telescopic extension and telescopic foot support.

Supporting the carrier on the vehicle roof top is a roof rack 96, as depicted in FIGS. 8, 9, and 11. The roof rack is mounted onto a vehicle roof. The roof rack has a first carrier rail 98 and a second carrier rail 102. The first and second carrier rails each being supported on the vehicle roof with a pair of end brackets 104. The first and second carrier rails each being a hollow metal structure with a plurality of lateral holes therein. The first carrier rail and the second carrier rail are spaced an equal distance about the vehicle roof to support the carrier in a releasable locking arrangement thereon as the vehicle is operated.

The first carrier rail and the second carrier rail each having a telescopic extension 106 with a telescopic foot support 108. For added protection a carrier rail support piece 109 is provided for each carrier rail. The carrier rail support piece is an extension of the connection to the carrier rail and stands out roughly 2½ feet from the car to prevent the wheel assembly from resting on the vehicle top.

In operation, the middle frame portion has at least two adjustable mounting pins 110 on each the first frame member and the second frame member. The plurality of mounting pins of the middle frame portion are in releasable engagement with at least one of the holes 112 of the first and second carrier rails for securing the carrier with the sporting equipment on the vehicle. In FIGS. 8 and 9, the holes may be seen. Further, when it is time to unload the carrier, the telescopic extension of the first carrier rail is extended so to allow the telescopic foot support to be extended parallel to the transporting vehicle and placed on the ground. Once extended, the adjustable mounting pins are quickly released from the carrier rails and the front frame portion of the carrier is slid across the carrier rails.

The system is for loading and unloading of kayaks and canoes, roof boxes, and bicycles on top. It's a solo system that the user operates alone. It's made of aluminum; basically, it has swing action. When the system is lying on top of the car, the wheel assembly is in the upright position. After unloading the carrier 14 onto the ground, the wheels of the wheel assembly swing about the first and second link arm coupled within the connector, as a swing arm that goes from one end of the main frame and then goes into the middle frame portion of the main frame so the wheels are in the middle. The way the system works with the carrier rails is that you slide the carrier away from the back end of the car first, which by doing this, really, it's like having a second person. The carrier is slid away from the back end so the user now has ½ the carrier hanging off the side of the vehicle, which really represents having a second person holding it, and this is the way the system works. Specifically, the car becomes the second party and takes 50% of the weight of carrier and equipment. This allows the user to unload the heavy weight of f the car. So instead of unloading 80 lbs. of the equipment (i.e. kayak), it takes about 30% to 40% of the weight lbs. of the load which allows anybody to load and unload. Further, the rotation of the carrier about the roof rack has to do with angles and balance, that way the carrier is balanced and easy for anybody to load and unload.

Figure 13:
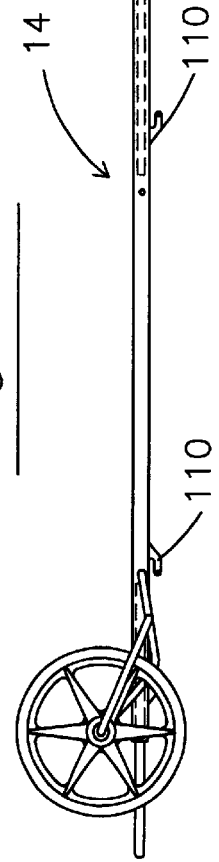
FIG. 13 is a side view of the alternative embodiment the carrier and wheel assembly of FIG. 12.
Figure 14:
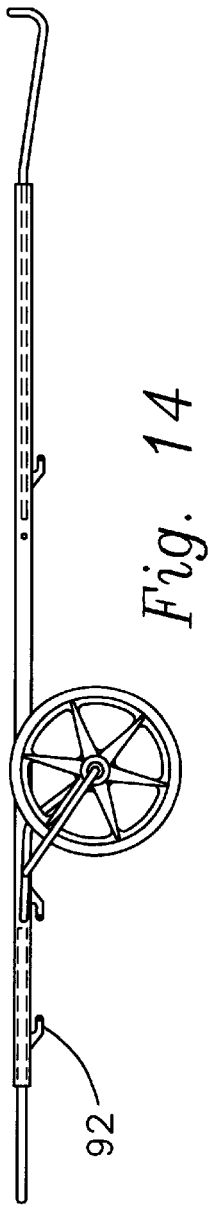
FIG. 14 is a side view of the alternative embodiment of the carrier with the wheel assembly in an operable orientation.
Figure 15:
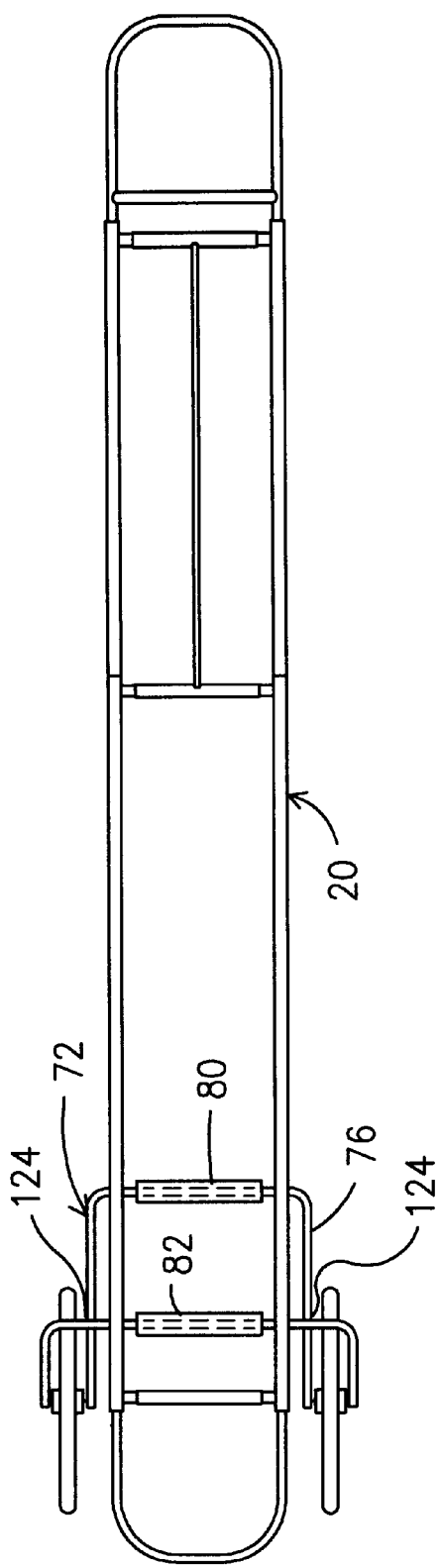
FIG. 15 is a top plan view of a second alternative embodiment of the wheel assembly of the carrier.
Figure 16:
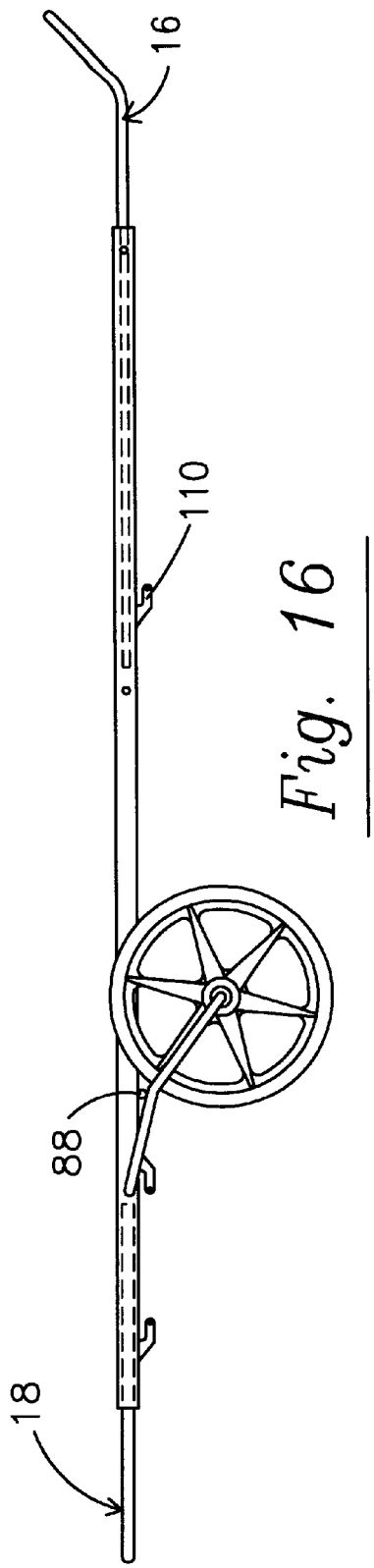
FIG. 16 is a side view of the carrier with the second alternative embodiment of the wheel assembly coupled thereto.

As shown in FIGS. 13–14, the present invention can come in an alternative embodiment. This particular design is identical to that in FIGS. 2–4. The difference being that the wheel assembly spans a greater distance from the middle frame portion to accommodate wider sporting and non-sporting equipment. Also, the handle is wider and has a shorter curve. The wheel assemblies of FIGS. 1, 2–5, 7 and 12–14 are comprised of welded components. The inventor through experimentation discovered a second embodiment for the wheel assembly that is comprised of non-welded parts. That embodiment is shown in FIGS. 15–18. The wheel assembly of FIG. 15 shows a first carriage assembly 72 coupled with a second carriage assembly 76. The first and second carriage assemblies are coupled together by a connector. As illustrated in FIG. 18, when the connector is used to connect the first and second carriage assemblies a first part 116 is created. Further, the wheel assembly of the FIG. 15 is shown to have a first linking arm 86 and a second linking arm 88. The first linking arm and the second linking are coupled together by a long bar 82. The coupling of the first and second linking arms form a second part 118 that has a length that is about one-half the length of the first part. The width of the second part is greater than the width of the first part. The second part is coupled to the first part just above the bend. The second part has a matching bend, as in FIG. 19, to allow both the first and second part to couple with the wheels of the wheel assembly. As shown in FIG. 15 the first and second parts are bolted at 124.

In actual use, the front frame portion 16 on the front of the car is first swung out from the car and allowed to sit on the telescoping extension positioned earlier. The user will swing the front of the carrier system out to the front of the vehicle where the extension is in place. Then the user will come around the back and lift the rear frame portion 18 around the back of the car so now the user is facing the front of the vehicle and standing alongside the car holding the carrier. The front end is on the telescopic extension, which is supported by the telescopic foot support. The rear frame portion is lowered onto the ground so now the carrier is at an angle with the front frame portion facing the sky. The user then undoes the two sliders within the mounting pin 92, that are holding the long bar of the wheel assembly in its resting position. By doing this, it releases the wheel assembly that is rotatable about the main support. The user grabs the rear frame portion, lifts up the carrier, and the swing action of the wheel assembly, within the pass throughs of the middle frame portion 20, will cause the wheel assembly to swing down and come into the operational position on the ground. The position of the wheels on the ground supports about 1½ to 2' off the ground. The user then walks to the front and grabs hold of the front frame portion, which is leaning against the telescopic extension. The user lifts the front frame portion over and across the way from the front telescopic extension and then lowers the front frame portion to allow the main frame to be almost parallel to the ground as the two wheels support the carrier and equipment on the ground.

To load the carrier, the above process is reversed. The telescopic extension is still in there. The user just lifts up the carrier again at the front frame portion and slides it back onto the telescopic extension. Then the user goes to the rear end and lifts up the rear frame portion—by lifting up slightly because of the wheel assembly and the framework being perfectly balanced, as soon as you lift it up, the wheel assembly will swing back instantly for repositioning the resting position. Then, the user lowers the rear end back down again with the wheel assembly in the resting, and then the user gets the sliders and you lift up the wheels slightly, about an inch or two, and then you just slide your sliders into a locked, safety position, within the mounting pin 92.

Once this is done, the user will grab the rear frame portion and put the weight on the telescopic extension. When the rear frame portion is grabbed, the user starts to walk forward while lifting up and pushing the carrier forward. Lifting up and pushing the carrier at the same time causes the carrier to be perfectly balanced on the telescopic extension. When the user can feel the weight taking over the front, the user stops and slides the rear end back over to the car and the carrier rail. Next the user walks to the front of the vehicle. The front frame portion is slid over to the other carrier rail, and then the adjustable mounting pins are placed back into the carrier rail holes and secured tightly by screwing them on. On the adjustable mounting pins, there's a hole so when they slide through the carrier rail hole, a safety pin can be used with a front and back tie-up to the front and rear end of the car.

The same two carrier rails can support two kayaks, canoes, etc. Basically, one is on the front, and then one is on the back so you can have one coming out that way, and one coming out that way. You then slide them so they're both running adjacent to one another. The kayaks are taken off one at a time. Because there are two bars, it's like having double width.

Furthermore, for protection of the equipment, each of the spreader tubes may be covered with a padded cover. Also, the handle of the front frame portion and the rear frame portion may be covered with a rubber grip.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is as follows:

1. A new and improved vehicle roof rack and carrier for easy loading/unloading of sporting equipment comprising, in combination:

a carrier formed by a front frame portion, a rear frame portion, a middle frame portion, and a wheel assembly;

the middle frame portion being formed by a first frame member and a second frame member being coupled together with an I-shaped guide bar, the first frame member and the second frame member each having spaced apart mounting pins, the middle frame portion having a first end arm pair and a second end arm pair formed by the simultaneous coupling of the I-shaped guide bar with the first frame member and the second frame member, the first end arm pair being coupled with the front frame portion, and the second end arm pair being coupled with the rear frame portion;

the wheel assembly having a first carriage assembly with a wheel and a second carriage assembly with a wheel, the first carriage assembly being rotatably positioned within the first frame member of the middle frame portion, the second carriage assembly being rotatably positioned within the second frame member of the middle frame portion, the first carriage assembly and the second carriage assembly being in pivotal communication via a connector; and;

a roof rack being mounted onto a vehicle roof, the roof rack having a first carrier rail and a second carrier rail, the first and second carrier rail each being supported on the vehicle roof with a pair of end brackets, the first carrier rail and the second carrier rail being spaced an equal distance about the vehicle roof to support the carrier in a releasable locking arrangement by the engagement of the mounting pins of the middle frame portion with the carrier rails when the vehicle is operated.

2. The vehicle roof rack and carrier as set forth in claim 1, wherein the front frame portion having a handle with a pair of linear frame arms extending outwardly therefrom, the pair of linear frame arms coupling with the first end arm pair of the middle frame portion of the carrier.

3. The vehicle roof rack and carrier as set forth in claim 2, wherein the pair of linear frame arms further include a stabilizer bar therebetween and spaced from the handle.

4. The vehicle roof rack and carrier as set forth in claim 1, wherein rear frame portion having a handle with a pair of linear frame arms projecting outwardly therefrom, the pair of linear frame arms coupling with the second end arm pair of the middle frame portion of the carrier.

5. The vehicle roof rack and carrier as set forth in claim 1, wherein the I-shaped guide bar has a first spreader tube and a second spreader tube coupled with a linear rod, the linear rod being parallel to the first frame member and the second frame member when the I-shaped guide bar being coupled thereto.

6. The vehicle roof rack and carrier as set forth in claim 5, wherein the first frame member and the second frame member of the middle frame portion each having three vertical projections, two of the three vertical projections of each of the first and second frame members are engaged by the first and second spreader tubes of the I-shaped guide bar, one of the three vertical projections of each of the first and second frame members is coupled with a third spreader tube.

7. The vehicle roof rack and carrier as set forth in claim 1, wherein the first carriage assembly having a first linking arm, and the second carriage assembly having a second linking arm.

8. The vehicle roof rack and carrier as set forth in claim 7, wherein first linking arm is positioned through the first frame member, the second linking arm is positioned through the second frame member, and the connector is used to hold the first and second linking arms in communication with the middle frame portion to allow the wheel assembly to pivot up and down with respect to the middle frame portion.

9. The vehicle roof rack and carrier as set forth in claim 1, wherein the first carrier rail and the second carrier rail each having a telescopic extension with a telescopic foot support.

10. A vehicle roof rack and carrier for easy loading/unloading of sporting equipment comprising:
a carrier formed by a front frame portion, a rear frame portion, a middle frame portion and a wheel assembly;
the middle frame portion having a plurality of spaced apart mounting pins;
a roof rack being mounted onto a vehicle roof, the roof rack having a first carrier rail and a second carrier rail, the first and second carrier rails each being supported on the vehicle roof with a pair of end brackets, the first carrier rail and the second carrier rail being spaced an equal distance about the vehicle roof to support the carrier, the plurality of mounting pins of the middle frame portion being in releasable engagement with the first and second carrier rails for securing the carrier with the sporting equipment on the vehicle; and
the first carrier rail and the second carrier rail each having a telescopic extension with a telescopic foot support, wherein the telescopic extension of the first carrier rail being extended so to allow the telescopic foot support to be extended parallel the transporting vehicle and placed on the ground.

11. The vehicle roof rack and carrier as set forth in claim 10, wherein, the middle frame portion being formed by a first frame member and a second frame member being coupled together with an I-shaped guide bar, the middle frame portion having a first end arm pair and a second end arm pair formed by the simultaneous coupling of the I-shaped guide bar with the first frame member and the second frame member.

12. The vehicle roof rack and carrier as set forth in claim 11, wherein, the first end arm pair being coupled with the front frame portion and the second end arm pair is coupled with the rear frame portion.

13. The vehicle roof rack and carrier as set forth in claim 11, wherein, the wheel assembly having a first carriage assembly with a wheel and a second carriage assembly with a wheel.

14. The vehicle roof rack and carrier as set forth in claim 11, wherein rear frame portion having a handle with a pair of linear frame arms projecting outwardly therefrom, the pair of linear frame arms coupling with the second end arm pair of the middle frame portion of the carrier.

15. The vehicle roof rack and carrier as set forth in claim 11, wherein the front frame portion having a handle with a pair of linear frame arms extending outwardly therefrom, the pair of linear frame arms coupling with the first end arm pair of the middle frame portion of the carrier.

16. The vehicle roof rack and carrier as set forth in claim 15, wherein, the first carriage assembly being rotatably positioned within the first frame member of the middle frame portion, the second carriage assembly being rotatably positioned within the second frame member of the middle frame portion, the first carriage assembly and the second carriage assembly being in pivotal communication via a pair of connectors.

17. A vehicle roof rack and carrier for easy loading/unloading of sporting equipment comprising:
a front frame portion;
a rear frame portion;
a middle frame portion, the middle frame portion having a first end arm pair and a second end arm pair, the first end arm pair being coupled with the front frame portion and the second end arm pair being coupled with the rear frame portion, the middle frame portion having a plurality of spaced apart mounting pins;
a wheel assembly being spaced from the rear frame portion and in pivotal communication with the middle frame portion via a pair of connectors for forming a carrier; and
a roof rack being mounted onto a vehicle roof, the roof rack having a first carrier rail and a second carrier rail, the first and second carrier rails each being supported on the vehicle roof with a pair of end brackets, the first carrier rail and the second carrier rail being spaced an equal distance about the vehicle roof to support the carrier, the plurality of mounting pins of the middle frame portion being in releasable engagement with the first and second carrier rails for securing the carrier with the sporting equipment on the vehicle.

18. The vehicle roof rack and carrier as set forth in claim 17, wherein the middle frame portion being formed by a first frame member and a second frame member being coupled together with an I-shaped guide bar, the middle frame portion having a first end arm pair and a second end arm pair formed by the simultaneous coupling of the I-shaped guide bar with the first frame member and the second frame member.

19. The vehicle roof rack and carrier as set forth in claim 18, wherein the wheel assembly having a first carriage assembly with a wheel and a second carriage assembly with a wheel, the first carriage assembly being rotatably positioned within the first frame member of the middle frame portion, the second carriage assembly being rotatably positioned within the second frame member of the middle frame portion, the first carriage assembly and the second carriage assembly.

* * * * *